United States Patent
Del Signore

(10) Patent No.: US 8,224,357 B2
(45) Date of Patent: Jul. 17, 2012

(54) METHOD FOR PAGING A MOBILE UNIT BASED ON PREVIOUS NETWORK INTERACTIONS

(75) Inventor: Kenneth W Del Signore, North Aurora, IL (US)

(73) Assignee: Alcatel Lucent, Paris (FR)

( * ) Notice: Subject to any disclaimer, the term of this patent is extended or adjusted under 35 U.S.C. 154(b) by 700 days.

(21) Appl. No.: 12/291,792

(22) Filed: Nov. 13, 2008

(65) Prior Publication Data

US 2010/0120451 A1    May 13, 2010

(51) Int. Cl.
*H04W 68/00* (2009.01)
(52) U.S. Cl. ...................................................... 455/458
(58) Field of Classification Search .................. 455/458
See application file for complete search history.

(56) References Cited

U.S. PATENT DOCUMENTS

| | | | |
|---|---|---|---|
| 5,956,637 A * | 9/1999 | Ericsson et al. | 455/432.3 |
| 7,269,425 B2 * | 9/2007 | Valko et al. | 455/456.1 |
| 7,489,936 B1 * | 2/2009 | Liu | 455/456.1 |
| 7,940,710 B2 * | 5/2011 | Prakash et al. | 370/311 |
| 2007/0293245 A1 * | 12/2007 | Del Signore et al. | 455/458 |
| 2009/0042587 A1 * | 2/2009 | Kamdar et al. | 455/458 |

* cited by examiner

*Primary Examiner* — Nathan Mitchell
(74) *Attorney, Agent, or Firm* — J. K. Jacobs

(57) ABSTRACT

To address the need for new techniques that can improve paging efficiency, a network may employ a method such as that depicted in flow diagram 100 of FIG. 1. The network combines (110) at least one active set associated with each of N previous interactions of a mobile unit to produce a last location set, where N is a number of previous interactions of the mobile unit with the network. The network then initiates (120) paging of the mobile unit in each coverage area represented in this last location set. This method may be further optimized by determining the value of N such that a desired probability of locating the mobile unit in a coverage area represented in the last location set is at least minimally achieved.

16 Claims, 5 Drawing Sheets

| Last Location Override | Desired Probability Level |
|---|---|
| 0th Page Attempt | .70 |
| 1st Page Attempt | NULL |
| 2nd Page Attempt | NULL |
| 3rd Page Attempt | .90 |
| 4th Page Attempt | NULL |

| N | P(T) | P(S) |
|---|------|------|
| 1 | .77 | .87 |
| 2 | .88 | .91 |
| 3 | .91 | .87 |

FIG. 5

METHOD FOR PAGING A MOBILE UNIT BASED ON PREVIOUS NETWORK INTERACTIONS

FIELD OF THE INVENTION

The present invention relates generally to communication systems and, in particular, to paging mobile units based on previous network interactions.

BACKGROUND OF THE INVENTION

One exceptional feature of mobile units (cell phones, for example) is the ability to place and receive calls from diverse geographic locations. The ability of mobile units to roam across multiple coverage areas enables them to be used nearly ubiquitously. Mobile units involved in active calls or other services typically hand off from a current base station to a new base station as the mobile unit moves from the coverage area (i.e., the cell or sector) of the first base station to the coverage area of the new base station.

However, mobile units may also move across coverage areas without handing off or registering in the new cell/sector. When the network needs to locate the mobile unit, such as when someone is trying to call the unit, the network will page the mobile. Many techniques for where and how to page a mobile unit are known. However, since paging mobile units often requires a substantial portion of a network's limited signaling resources, new techniques that can improving paging efficiency are desirable, even if only applicable in certain situations.

BRIEF DESCRIPTION OF THE DRAWINGS

FIG. 4 is a table depicting operator settings for triggering a last location page override to illustrate an example of how some specific embodiments of the present invention may operate.

FIG. 5 is a table depicting anticipated probabilities of locating a mobile unit for various values of N to illustrate an example of how some specific embodiments of the present invention may operate.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Figure 1:
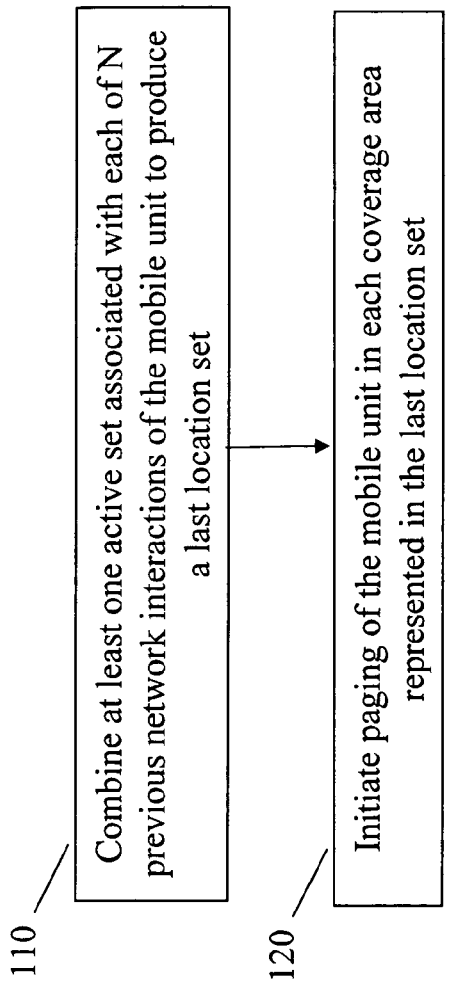
FIG. 1 is a logic flow diagram of functionality performed by a communications network in accordance with various embodiments of the present invention.

To address the need for new techniques that can improve paging efficiency, a network may employ a method such as that depicted in flow diagram 100 of FIG. 1. The network combines (110) at least one active set associated with each of N previous interactions of a mobile unit to produce a last location set, where N is a number of previous interactions of the mobile unit with the network. The network then initiates (120) paging of the mobile unit in each coverage area represented in this last location set. This method may be further optimized by determining the value of N such that a desired probability of locating the mobile unit in a coverage area represented in the last location set is at least minimally achieved.

Figure 2:
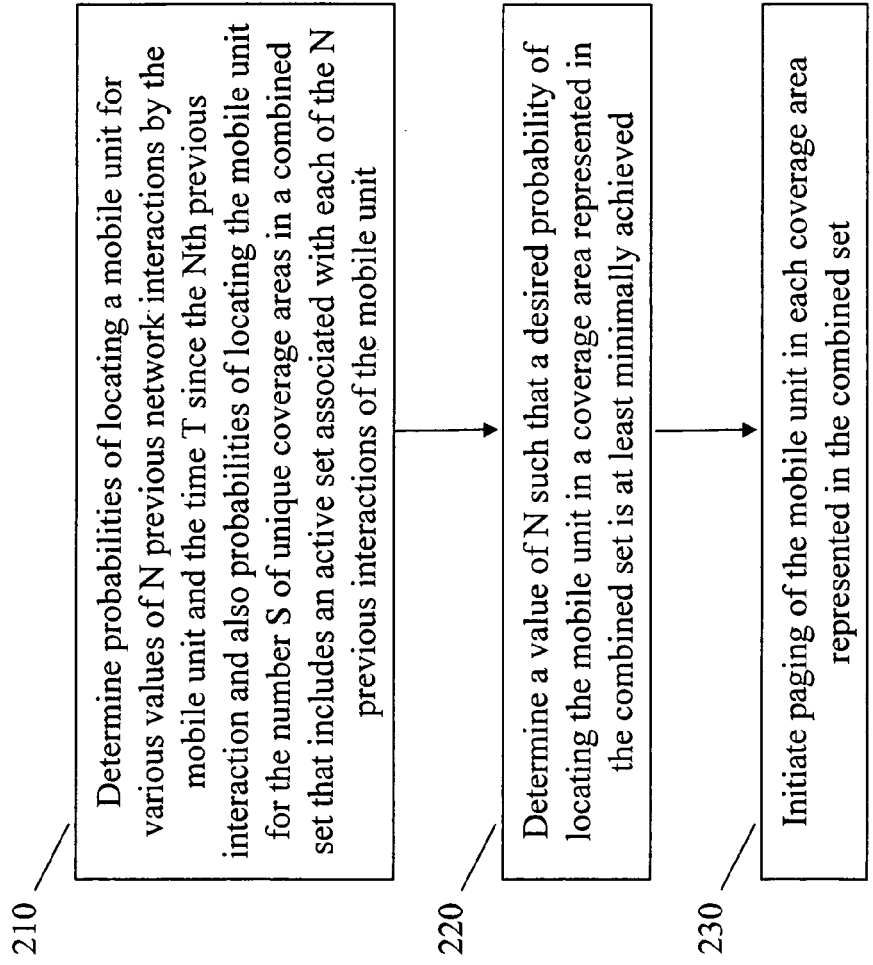
FIG. 2 is a logic flow diagram of functionality performed by a communications network in accordance with some embodiments of the present invention.

The present invention can be more fully understood with reference to FIGS. 2-5. FIG. 2 is a logic flow diagram 200 of functionality performed by a communications network in accordance with some embodiments of the present invention. When a mobile unit needs to be paged for some network service, network equipment, such as a network controller, determines (210) a probability of locating the mobile unit for a given value of N and a time T since the Nth previous interaction of the mobile unit with the network. Examples of previous interactions of the mobile unit with the network include signaling for service origination, signaling for service termination, and/or signaling for registration. Any of these may be considered an interaction for purposes of this functionality depending on the embodiment. The network equipment additionally determines a probability of locating the mobile unit for a given value of N and a number S of unique coverage areas in a combined set that includes an active set associated with each of the N previous interactions of the mobile unit. In most embodiments, cells, sectors, or both may be included in the combined set of coverage areas.

The network equipment also determines (220) the value of N such that a desired probability of locating the mobile unit in a coverage area represented in the last location set is at least minimally achieved. Thus, probabilities for various values of N may need to be determined above in order to find a value of N for which the probability of locating the mobile unit in the corresponding combined set achieves the desired probability. This desired probability is a value that may be provisioned by the network operator. The network equipment then initiates (230) paging of the mobile unit in each coverage area represented in the combined set corresponding to the determined value of N.

Figure 3:
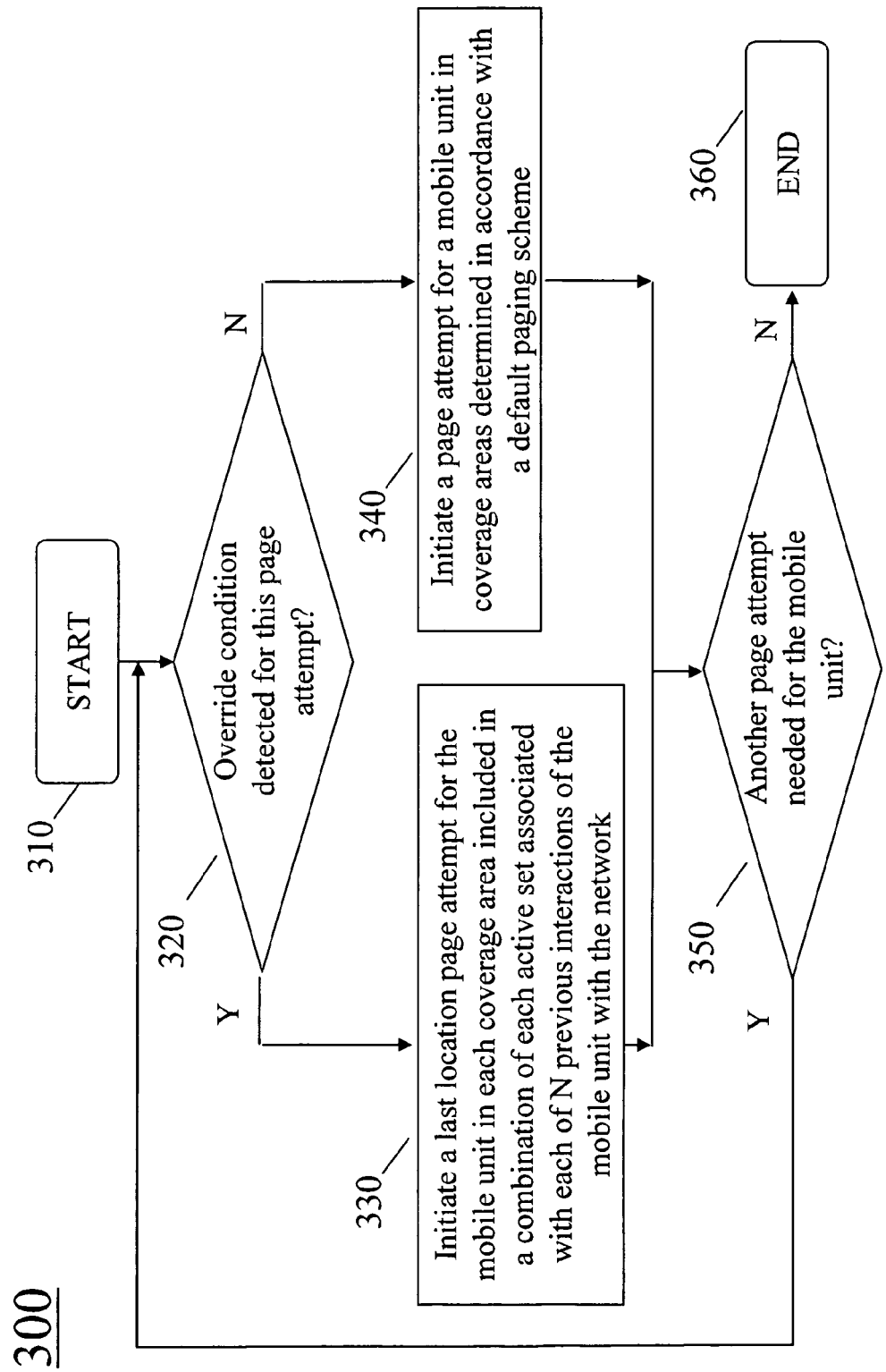
FIG. 3 is a logic flow diagram of functionality performed by a communications network in accordance with certain embodiments of the present invention.

FIG. 3 is a logic flow diagram 300 of functionality performed by a communications network in accordance with certain and perhaps other embodiments of the present invention. The logic flow begins (310) with network equipment, such as a network controller, beginning the process of paging a mobile unit. If (320) an override condition is not present for the current paging attempt, an attempt in coverage areas determined in accordance with some default paging scheme is initiated (340). This default paging scheme may be one of the many well-known schemes that are in use today.

This override condition varies from embodiment to embodiment and may be particular to the service for which the mobile unit is being paged and/or particular to which paging attempt is being processed. For example, the override condition may be a condition in which an anticipated probability of locating the mobile unit in a coverage area represented in a last location set is at least that of a desired probability level. Here, the last location set is a combination of each active set associated with each of N previous interactions of the mobile unit with the network, and the desired probability level is a network operator provisioned value that may vary from one service type to the next and/or from one page attempt to the next. When the override condition is detected, the network equipment initiates (330) paging of the mobile unit in each coverage area represented in this last location set.

If (350) a subsequent page attempt is needed for the mobile unit, an override condition is checked for again and the flow described above is repeated; otherwise the logic flow ends (360). In this manner, embodiments of the present invention may be incorporated into existing paging systems and tuned (e.g., by advantageously setting the override condition(s)) to improve paging efficiency in certain situations.

Figure 5:
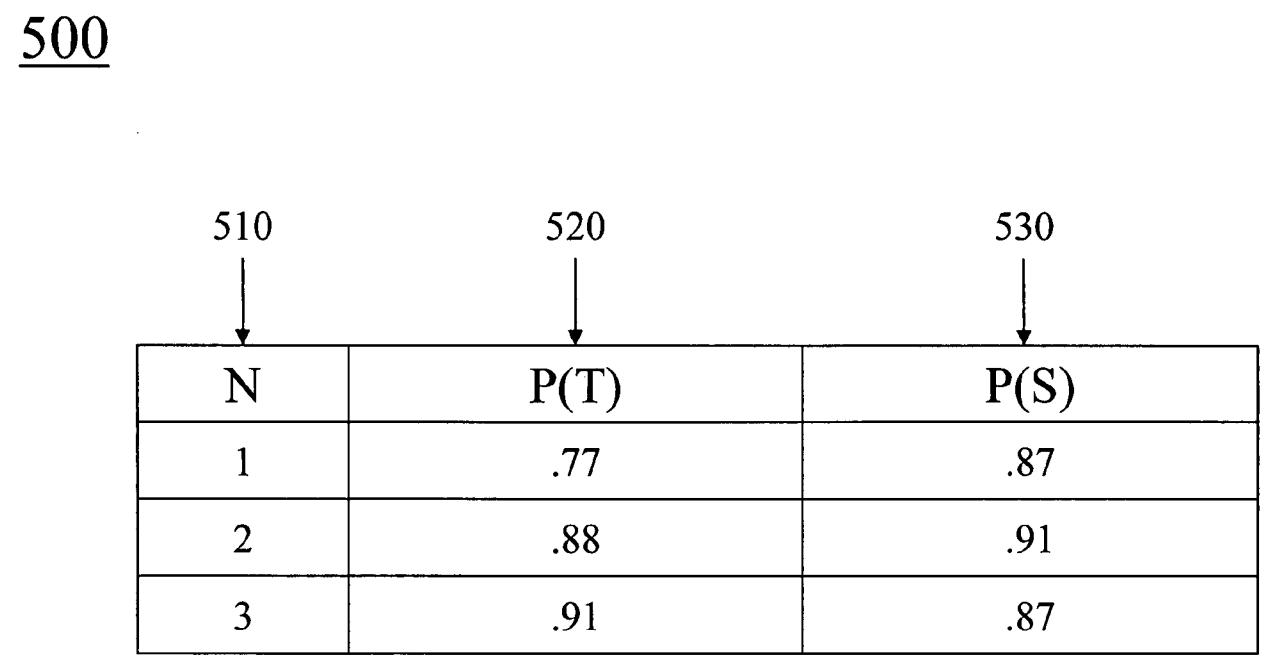

To provide a greater degree of detail in making and using various aspects of the present invention, a description of certain, quite specific, embodiments follows for the sake of example. FIGS. 4 and 5 are referenced in an attempt to illustrate an example of how some specific embodiments of the present invention may operate. FIG. 4 provides a table 400 that depicts some possible operator settings for triggering a last location page override, while FIG. 5 provides a table 500 that depicts some possible anticipated probabilities of locating a mobile unit for various values of N.

In the embodiments that follow, location information from a mobile's previous interactions is used to do a limited area page on certain page attempts to the mobile. The limited area page involves paging only the sectors or cells that the mobile was previously seen on. This page is referred to as a Last Location (LL) page.

Data from the previous interactions can be used to determine the probability of finding the mobile with an LL page. This data includes the number of interactions, timing, and number of unique sectors. The probability of success can be parameterized as a function of the number of previous calls (N), the times of these (T), and the total number of unique sectors seen (S). In order to calculate the probability of success, the mobile switching center (MSC) stores data from the recent previous call attempts of all, or nearly all, mobiles. Such information may be tabulated in real time on each HVLR. For example, the last ~6 soft handoff sets of each mobile (e.g., the last set recorded for each call) and the times of these may be recorded.

Tests indicate that the probability of finding a mobile with an LL page goes up appreciably with the number of previous calls by that mobile that are considered. However, at some point, as the number of cell-sectors in the list goes up, the probability of finding the mobile on the list tends to go down. This is because a larger number of sectors tends to indicate that the mobile is moving.

For any page attempt, the service provider can provision a probability threshold for attempting an LL page. If the probability, $P(N,T,S)$, of the mobile being successfully paged exceeds the provisioned probability, then the LL page will be used for this attempt, otherwise the default paging mechanism is used. An LL page may also be used for a 0th page attempt, i.e., an initial page attempt before what would be considered the 1st page attempt of other existing paging mechanisms. This 0th LL page attempt may nominally be for short message service (SMS) pages where there is a benefit to trying an LL page even though the probability of success may be relatively low. (Typically, the added delay incurred by an LL SMS page not being successful is of much less concern than would be the added delay incurred for a voice call page.)

In FIG. 4, table 400 depicts some possible operator settings for triggering an LL page override. For each page attempt in column 410, an operator may provision a desired probability level in column 420 for triggering an LL page override for that page attempt. Thus, table 400 indicates that a Last Location page should be performed on the 0th and 3rd page attempts if the probability of finding the mobile is at least 70% and 90%, respectively.

For any given mobile, we then have the parameters N, T and S, where N is the number of previous calls, T is the time since the Nth previous call and S is the number of unique sectors seen in the N previous calls. Then, for a given set of N previous calls, the stored information for the larger set of mobiles can be used to determine the expected probability of finding the mobile with a Last Location page.

For example, assume a mobile had N=3 previous calls at times 10, 20, and 40 minutes in the past, and the sectors seen were: a,b; a,b,c; and b,d. Then for N=1, 2, 3, the mobile's T values are 10, 20, 40, and its S values are 2, 3, 4, respectively. These values and the stored information for the larger set of mobiles are then used determine the probability of finding the mobile with an LL page.

In FIG. 5, table 500 depicts some possible anticipated probabilities of locating the mobile unit for N=1, 2, 3. These probability numbers are provided simply for the sake of example, since in reality they would depend on a large amount of historical data collected on a live system in real-time. For the sake of the present description then, table 500 provides a probability of finding the mobile with an LL page as a function of T (column 520) and as a function of S (column 530) for each value of N (column 510), as shown.

Thus, from the provisioning example given on in FIG. 4, a 0th page attempt would be tried if the expected probability is at least 0.7. The N=1 case exceeds this probability since $P(T)=0.77$ and $P(S)=0.87$, so a 0th page would be attempted. However, the 3rd page override is provisioned with a probability of 0.9. In this case the P(T) value passes for N=3 (i.e., $P(T)=0.91$), but the P(S) value of 0.87 does not, so the Last Location page would not be used for the 3rd attempt.

The LL page works when the mobile has not moved from it's previous locations. Therefore, if the MSC has an indication that the mobile has moved, or is moving, it should zero out the previous call data. One such mechanism is to detect that the final sector list of a call does not contain the initial primary sector of the call. In this case, the mobile is assumed to be moving and all previous call data should be erased after the call ends. On a subsequent termination, then, an LL page will not be attempted.

Another mechanism that may be used to detect that a mobile is moving is to detect that the sectors from the current call do not match any of the sectors from the previous calls. In this case, it is assumed that the mobile has at least moved between the current call and the previous calls, so the previous call data should be erased and only the data from the current call stored.

Zone boundary registration can also indicate a moving mobile. The nominal scenario is a mobile that has just traveled into this MSC. In this case, there would be no recent location information stored for the mobile and it should therefore be treated as moving. However, mobiles that are stationary on the MSC border will toggle back and forth. In this case, we would have a recent last seen cell/sector and a timestamp for the mobile; thus, it should not be treated as moving. If the mobile has any network interactions while toggled to this MSC, there will also be N,T,S data stored.

LL paging may be of particular value to SMS calls. For example, the benefit of using the LL page on the 3rd page of SMS calls is that a larger percentage of SMS calls make it to the 3rd page attempt. This is because SMS calls that do not page respond are automatically resent some time later. Also, when a border system receives an ISPAGE from an SMS termination at a border system, it may be desirable to flag it for LL paging.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

The present invention may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more.

Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for paging a mobile unit in a network comprising:
   combining at least one active set associated with each of N previous interactions of the mobile unit to produce a last location set, wherein N is a number of previous interactions of the mobile unit with the network;
   determining a probability of locating the mobile unit for a given value of N and a time T since the Nth previous interaction;
   initiating paging of the mobile unit in each coverage area represented in the last location set.

2. The method as recited in claim 1, wherein each coverage area comprises one of a cell or a sector.

3. The method as recited in claim 1, wherein previous interactions of the mobile unit with the network comprise signaling for at least one of service origination, service termination, or registration.

4. The method as recited in claim 1, wherein combining the at least one active set associated with each of N previous interactions of the mobile unit to produce the last location set comprises
   combining the last active set stored for each of N previous interactions of the mobile unit to produce the last location set.

5. The method as recited in claim 1, further comprising determining the value of N such that a desired probability of locating the mobile unit in a coverage area represented in the last location set is at least minimally achieved.

6. The method as recited in claim 1, further comprising determining a probability of locating the mobile unit for a given value of N and a number S of unique coverage areas in a combined set that includes an active set associated with each of the N previous interactions of the mobile unit.

7. The method as recited in claim 1, further comprising storing information regarding previous interactions of a plurality of mobile units with the network.

8. The method as recited in claim 7, further comprising using the stored information to tabulate, for various values of N and for various lengths of time since an Nth previous interaction, the probability of a mobile unit being located in a last location set derived using each of the various values of N.

9. The method as recited in claim 7, further comprising using the stored information to tabulate, for various values of N and for various numbers of unique coverage areas in a last location set derived using each of the various values of N, the probability of a mobile unit being located in such a last location set.

10. The method as recited in claim 1, further comprising storing information regarding interactions of the mobile unit with the network.

11. The method as recited in claim 10, further comprising deleting or marking for limited use stored information regarding the previous interactions of the mobile unit upon detecting that the mobile unit has moved a threshold amount.

12. A method for paging a mobile unit in a network comprising:
    providing a first paging scheme for paging mobile units in a network;
    initiating a paging attempt of a mobile unit in coverage areas determined in accordance with the first paging scheme unless an override condition is detected;
    when the override condition is detected, initiating paging of the mobile unit in each coverage area represented in a last location set, wherein the last location set is a combination of each active set associated with each of N previous interactions of the mobile unit with the network;
    prior to initiating the paging attempt in accordance with the first paging scheme, initiating an initial paging attempt of the mobile unit in each coverage area represented in the last location set.

13. The method as recited in claim 12, wherein the override condition comprises a condition in which an anticipated probability of locating the mobile unit in a coverage area represented in the last location set is at least that of a desired probability level.

14. The method as recited in claim 13, wherein the desired probability level is a network operator provisioned value.

15. The method as recited in claim 14, wherein the desired probability level is a network operator provisioned value applicable to at least one of a particular service type or a particular page attempt.

16. A method for paging a mobile unit in a network comprising:
    combining at least one active set associated with each of N previous interactions of the mobile unit to produce a last location set, wherein N is a number of previous interactions of the mobile unit with the network;
    initiating paging of the mobile unit in each coverage area represented in the last location set;
    storing information regarding interactions of the mobile unit with the network;
    deleting or marking for limited use stored information regarding the previous interactions of the mobile unit upon detecting that the mobile unit has moved a threshold amount.

* * * * *